United States Patent
Petitgrand et al.

(10) Patent No.: US 12,359,910 B2
(45) Date of Patent: Jul. 15, 2025

(54) DEVICE AND METHOD FOR MEASURING INTERFACES OF AN OPTICAL ELEMENT

(71) Applicant: FOGALE NANOTECH, Nîmes (FR)

(72) Inventors: Sylvain Petitgrand, Caissargues (FR); Alain Courteville, Congenies (FR)

(73) Assignee: FOGALE NANOTECH, Nîmes (FR)

( * ) Notice: Subject to any disclaimer, the term of this patent is extended or adjusted under 35 U.S.C. 154(b) by 206 days.

(21) Appl. No.: 18/245,605

(22) PCT Filed: Sep. 9, 2021

(86) PCT No.: PCT/EP2021/074816
§ 371 (c)(1),
(2) Date: Mar. 16, 2023

(87) PCT Pub. No.: WO2022/058236
PCT Pub. Date: Mar. 24, 2022

(65) Prior Publication Data
US 2023/0332885 A1     Oct. 19, 2023

(30) Foreign Application Priority Data
Sep. 21, 2020 (FR) ..................................... 2009566

(51) Int. Cl.
*G01B 11/24* (2006.01)
(52) U.S. Cl.
CPC ................ *G01B 11/2441* (2013.01)
(58) Field of Classification Search
CPC ............ G01B 11/2441; G01B 2290/70; G01B 9/02007; G01B 9/02028; G01B 9/02032; G01B 9/0209; G01M 11/0271
See application file for complete search history.

(56) References Cited

U.S. PATENT DOCUMENTS 9,658,129 B2    5/2017  Colonna De Lega et al.
2002/0196450 A1* 12/2002  Olszak ............... G01B 9/02057
                                                    356/511
(Continued)

FOREIGN PATENT DOCUMENTS

FR          3093560 A1    9/2020

OTHER PUBLICATIONS

International Search Report and Written Opinion received for PCT/EP2021/074816, mailed Nov. 9, 2021.
(Continued)

*Primary Examiner* — Hina F Ayub
(74) *Attorney, Agent, or Firm* — Greer, Burns & Crain, Ltd

(57) ABSTRACT

A device for interface shape of an optical element including at least one low-coherence light source, at least one optical sensor, an interferometric device illuminated by the light source and configured for shaping at least one measurement beam and at least two reference beams, directing one measurement beam to the element to pass through the interfaces, and directing the light from at least two interfaces to the sensor or sensors, each sensor globally configured for detecting at least two interference signals resulting respectively from interferences between the measurement beam reflected by one of the at least two interfaces and one of the reference beams; the measurement device also including a positioner for positioning a coherence area at the level of each interface and a digital processor for producing, from the interference signals, an item of information of the shape of each interface according to a field of view.

20 Claims, 6 Drawing Sheets

(56) References Cited

U.S. PATENT DOCUMENTS

| | | | |
|---|---|---|---|
| 2005/0219544 A1* | 10/2005 | Chan | A61B 5/0066 |
| | | | 356/497 |
| 2008/0285043 A1 | 11/2008 | Fercher et al. | |
| 2014/0233016 A1* | 8/2014 | Aiyer | G01B 9/02091 |
| | | | 356/497 |
| 2019/0250392 A1 | 8/2019 | Cuche et al. | |
| 2020/0271434 A1* | 8/2020 | Ishigaki | G01B 9/021 |

OTHER PUBLICATIONS

French Search Report received for Application No. 2009566, dated May 5, 2021.

* cited by examiner

DEVICE AND METHOD FOR MEASURING INTERFACES OF AN OPTICAL ELEMENT

BACKGROUND

The present invention relates to a measurement device, for measuring the shape of interfaces of an optical element comprising a plurality of interfaces. It also relates to a method for measuring the shape of interfaces and characterization of such an optical element.

The field of the invention is non-limitatively that of optical control and measurement systems, in particular for the manufacture of optical elements.

During the manufacture of optical elements, such as lenses or objectives comprising several lenses, it may be necessary to control or measure shapes of the interfaces, or surfaces, of the optical elements.

The optical elements, such as optical assemblies or imaging objectives, are generally constituted by one or a plurality of lenses and optionally other components intended to shape optical beams. These components, or these lenses, can be assembled in the form of a stack in a support such as a barrel.

The optical performance of such an optical element, for example an imaging objective, essentially depends on the precision of manufacture of the optical components (such as the lenses) of which it is composed, and the accuracy with which they are positioned in the assembly, both with respect to their optical axes and their respective distances, if applicable.

It is therefore necessary to control the components and their assemblies. In particular, it may be necessary in an assembly to control the shape of the interfaces of the optical components or lenses, with a view to determining for example elements that are non-compliant or incorrectly positioned, mis-shaped, or tilted.

A device and a method for controlling shapes of optical elements such as lenses are described in document U.S. Pat. No. 9,658,129 B2. The shapes of surfaces are measured by using an interferometric technique, in particular in order to determine the summit or apex thereof. However, this device requires the lens to be turned over in order to measure the two faces. It therefore only makes it possible to measure individual components, before they are assembled.

SUMMARY

An aim of the present invention is to overcome these drawbacks.

In particular, an aim of the invention is to propose a measurement device and method, for measuring the shape of interfaces or surfaces of an optical element, this device and this method allowing in particular measurements of interfaces in an optical assembly.

Another aim of the present invention is to propose a measurement device and method making it possible to measure simultaneously, or in one and the same measurement sequence, the shapes and/or the positioning of at least two different interfaces.

Another aim of the present invention is to propose a measurement device and method making it possible to measure simultaneously, or in one and the same measurement sequence, the shapes and/or the positioning of two different interfaces of one and the same optical element such as a lens.

A further aim of the present invention is to propose a measurement device and method suitable for measuring or controlling the shape and the positioning of one or more interfaces in an optical element through other interfaces of this optical element.

A further aim of the present invention is to propose a measurement device and method for measuring the shapes of successive interfaces, optionally simultaneously or in one and the same measurement sequence.

A further aim of the present invention is to propose a measurement device and method for measuring a plurality of interfaces of an optical element without the need to turn it over.

At least one of these aims is achieved with a measurement device, for measuring the shape of interfaces to be measured of an optical element comprising a plurality of interfaces, the device comprising:

- at least one low-coherence light source;
- at least one optical sensor;
- an interferometric device illuminated by said light source or sources and configured for:
  - shaping at least one measurement beam and at least two reference beams,
  - directing said at least one measurement beam to the optical element so as to pass through the interfaces to be measured,
  - directing the light coming from at least two interfaces to be measured, to the optical sensor or sensors,
- said optical sensor or sensors being globally configured to detect selectively at least two interference signals resulting respectively from interferences between the at least one measurement beam reflected by one of said at least two interfaces to be measured and one of the at least two reference beams;

the measurement device also comprising:

- positioning means configured for positioning a coherence area at the level of each of the at least two interfaces to be measured; and
- digital processing means configured for producing, from the interference signals, an item of information of the shape of each of said interfaces to be measured, according to a field of view.

Within the context of the present invention, an "optical element" can denote any type of optical object, intended for example to be inserted in an optical beam, to shape an optical beam, and/or to produce an image. It can denote for example:

- a single optical component such as a lens or a beamsplitter;
- an assembly of lenses and/or other optical components, such as an imaging objective, camera objective, or a device for shaping an optical beam.

An optical element can in particular be constituted by, or comprise, refractive elements such as lenses.

The device according to the present invention makes it possible to perform measurements of interfaces of an optical element, and in particular of stacked interfaces, in order to deduce therefrom the topology of these interfaces. These interfaces can for example comprise surfaces of lenses. The measurements make it possible to determine, for example, shapes and positionings of the interfaces, or a tilt or decentring of a lens in the optical element. It is also possible to deduce thickness measurements, and the refractive index of the material of a lens of which the optical element is composed.

The device according to the present invention makes it possible to perform these measurements for at least two interfaces simultaneously, or in one and the same measurement sequence, by virtue of the presence of at least two reference arms in the interferometric device. Thus, at least two distinct interference signals can be generated and detected simultaneously, or in the same sequence. It is for example possible to measure simultaneously or in the same sequence the two faces of an optical element, or the two interfaces on either side of a space between two components of an optical element, or else any interfaces of an optical element. Comparisons of positioning, decentring, etc. of these interfaces are then possible under the best conditions.

The measurements can be carried out with a measurement beam of the interferometer illuminated by a low-coherence light source. To this end, the device according to the invention has available positioning means for positioning a coherence area at the level of each interface to be measured, so that the interface is included in the coherence area. The interfaces to be measured can be "embedded" interfaces, i.e. interfaces inside the optical element. In order to reach such embedded interfaces, the measurement beam must therefore pass through other interfaces of the optical element.

By "coherence area" is meant the area in which interferences between the measurement beam and a reference beam can form on the optical sensor. The coherence area can be moved by varying the difference in the length of the optical path between the two beams, for example by modifying the optical length of one of the measurement or reference beams, or of both. When the coherence area is located at the level of an interface, the interference signals between the measurement beam reflected by this interface and the reference beam can be acquired.

The device according to the invention makes it possible to detect an interference signal selectively for each interface at the level of which a coherence area is positioned, i.e. for each surface located in a coherence area. In fact, the coherence length of the light source is adjusted so as to be shorter than a minimum optical distance between two adjacent interfaces of the optical element. Thus, for each measurement, a single interface is located in one of the coherence areas corresponding to a reference beam. Each of the interference signals acquired therefore comprises only the contribution of a single interface, or only originates from a single interface.

The interference measurements are performed according to a field of view determined by the measurement means of the device. The measurements can thus be carried out either full-field, or by scanning the field of view.

Digital processing means of the device according to the invention are configured to produce, from each interference signal, an item of information of the shape of a corresponding measured interface according to the field of view.

This item of shape information can comprise the optical shape and/or the geometric shape of the interface to be measured.

By "optical" shapes or distances is meant the shapes or distances as they are "seen" by the measurement beam. The distances or shapes of geometric surfaces are deduced therefrom by taking account in particular of the refractive index of the media passed through by the measurement beam.

Moreover, when the measurement beam passes through interfaces before the measured interface, the interference signal is representative of an "apparent" shape or distance, to the extent that it includes the contribution of the interface or interfaces passed through, in particular when these interfaces are situated between two media having different refractive indices, and thus deflect or modify the measurement beam by refraction and/or diffraction as a function of their shape. Therefore, the shape of these interfaces passed through must be taken into account, as explained hereinafter, in order to obtain the "real" optical and/or geometric shape of the interface measured.

The device according to the invention can be utilized, in particular, for measuring optical elements or assemblies during their production, for example objectives formed from lenses or microlenses such as objectives for smartphones or for the automotive industry.

According to an advantageous embodiment, the device according to the invention can also comprise means for determining, or measuring, a difference in optical paths between the reference beams.

The optical and/or geometric distance between the interfaces concerned can be obtained directly from the difference in optical paths between the reference beams, as measured, or known by internal adjustment.

This distance can be representative for example of the thickness of a lens, or the distance between two adjacent surfaces of two different components of the optical element.

According to an advantageous embodiment, the device according to the invention can comprise at least two delay lines, each inserted in one of the reference beams.

Preferably, the difference in optical path is introduced between the reference beams by the delay lines.

Preferentially, the optical delay lines can comprise means making it possible to adjust, in an accurate and known manner, and/or to measure, the optical delay introduced into each of them, and/or the difference in optical paths introduced between the measurement and reference beams of the two interferometers. To this end, the delay lines can comprise optical rules or internal interferometers making it possible to measure the movement of a mobile element such as a mirror.

It is thus possible to obtain very accurate distance measurements, as they are obtained from optical delay measurements internal to the measurement device. They are in particular free from the effects of vibrations or positioning errors of the interferometer with respect to the optical element to be measured, as they are obtained from simultaneous measurements of the interfaces in question.

According to an advantageous embodiment, the positioning means can also be configured to relatively position an object plane conjugate to an image plane of the sensor, at the level of or in proximity to an interface to be measured, or between the at least two interfaces to be measured.

The object and image planes are conjugate planes of the imaging system of the interferometric device, which means in other words that the object plane is imaged in the image plane by the imaging system.

According to the invention, it is thus possible to vary the focal length of the measurement beam, and/or the position of the interface to be measured with respect to the measurement beam, so as to acquire interferometric signals for each interface with the measurement beam focused on the interface in question. The interface to be measured is thus positioned in an object plane conjugate to the image plane of the interferometric sensor. This makes it possible in particular to optimize the coupled optical power in the sensor. Thus, by using an element collecting the measurement beam reflected from the interface with a wide numerical aperture, it is possible to measure interfaces with higher local slopes. For that reason, better shape measurements of the interfaces can be obtained. Furthermore, positioning the interface to be measured in the object plane conjugate to the image plane of the sensor allows easier reconstruction of the surface to be measured, avoiding in particular optical aberrations due to defocus.

Alternatively, it is possible for the interfaces not to be positioned in a conjugate object plane of the sensor, but in proximity to this conjugate object plane. This can make it possible to introduce a defocusing effect which can be desirable for certain signal processing techniques, such as digital holography. Defocusing can then be taken into account and compensated for by wave propagation algorithms.

For this, the device according to the invention may comprise means for relative positioning of an object plane conjugate to an image plane of the sensor at the level of, or in proximity to, an interface to be measured, or between the at least two interfaces to be measured.

Positioning the coherence areas at the level of the interfaces may, for example, be carried out by utilizing an item of information of visibility or contrast of the interference signal, or by using prior knowledge or a model of the optical element.

According to an example, the interferometric device is of the Michelson or Linnik type interferometer.

According to another example, the interferometric device is of the Mach-Zehnder type interferometer.

The device according to the invention may comprise a light source, the light from which is distributed between several distinct reference arms, so as to form several distinct reference beams.

Alternatively, the device according to the invention may comprise a plurality of light sources, each illuminating for example one reference arm.

The device according to the invention may in particular comprise two light sources with wavelengths different to one another.

The device according to the invention may comprise a plurality of optical sensors, each one being illuminated by a distinct reference beam.

According to an example, the reference beams may have distinct optical paths up to the sensors.

According to another example, the reference beams may have at least a part of their optical path in common, and be separated by a beamsplitter element, for example polarizing or dichroic, before the optical sensors.

Alternatively, the device according to the invention may comprise an optical sensor, illuminated by a plurality of reference beams. In this case, the interference signals obtained with the different reference beams should be capable of being distinguished. This distinction may be implemented in different ways.

According to an example, the sensor may be illuminated sequentially by the different reference beams, for example in one and the same measurement sequence. This can be carried out in particular with shutters in the reference arms or several light sources turned on in sequence.

According to another example, the sensor may comprise, for example at the level of the pixels, colour filters making it possible to separate interference signals obtained with sources of different wavelengths.

According to yet another example, the sensor may be illuminated by reference beams incident on this sensor according to different angles, and preferably also different from the angle of incidence of the measurement beam. Thus off-axis interferometry configurations are produced, with interference signals that can be separated in the Fourier domain as a function of the angle formed by the respective measurement and reference beams.

The device according to the invention may comprise a full-field imaging system, with one or more optical detectors of the imaging sensor or camera type making it possible to image interfaces of the optical element, or interferometric signals corresponding to an interface, according to a field of view. It can in particular comprise an imaging optical sensor with an array detector of the CCD or CMOS type.

The device according to the invention may be produced with free-propagation optical components, and/or comprise guided optics parts using waveguides and/or optical fibres.

In particular, the reference beams, which do not contribute to the imaging of the optical element to be measured, may be produced at least partially with guided optics components or those based on optical fibres.

According to another aspect of the invention, a measurement method is proposed, for measuring the shape of interfaces to be measured of an optical element comprising a plurality of interfaces, the method being implemented by a measurement device comprising at least one low-coherence light source, at least one optical sensor, an interferometric device illuminated by said light source or sources and configured for (i) forming at least one measurement beam and at least two reference beams, (ii) directing said at least one measurement beam to the optical element so as to pass through the interfaces to be measured, and (iii) directing the light coming from at least two interfaces to be measured to the optical sensor or sensors, the device also comprising positioning means and digital processing means, the method comprising the following steps:

positioning, by positioning means, a coherence area at the level of each of the at least two interfaces to be measured;

detecting selectively, by said optical sensor or sensors, at least two interference signals resulting respectively from interferences between the at least one measurement beam reflected by one of said at least two interfaces to be measured and one of the at least two reference beams, respectively; and processing the interference signals by the digital processing means, so as to produce an item of information of the shape of each of said interfaces to be measured according to a field of view.

The method according to the invention may also comprise steps of analysis of the interfaces, by utilizing the items of information of shape.

It is thus possible to determine, in particular:
a geometric shape of an interface;
a comparison between a shape of an interface and a geometric model;
a decentring and/or a tilt of the interfaces, for example with respect to a frame of reference of the optical element;
a relative position, a decentring and/or a tilt of one interface with respect to another.

Simultaneous acquisition of the items of information of shape from several interfaces or surfaces allows high quality comparative or relative positioning analyses, since the measurements are free from drift or vibrations.

According to a particularly advantageous embodiment, the method according to the invention may also comprise a step of determining, or measuring, a difference in optical paths between the reference beams.

The method may also comprise a step of determining an optical and/or geometric distance between the interfaces to be measured, by using the difference in optical paths between the reference beams obtained.

This thus makes it possible to obtain directly the optical and/or geometric distance between the interfaces measured.

Thus, the method according to the invention is particularly effective for analysing optical elements, in particular comprising lenses. Simultaneously measuring the shape of two interfaces as well as the distance between them makes it possible for example:

to characterize or control the shape of a lens, by measuring the shape of the surfaces, the curves, the relative positions of the centres of the curves, the tilt and the decentring of the surfaces;

to measure the relative position of two lenses in an assembly, including in particular the space between them, and the relative tilt and decentring of these elements due for example to assembly defects.

The method according to the invention may also comprise a step of relative positioning of an object plane conjugate to an image plane of the sensor at the level of, or in proximity to, an interface to be measured, or between the at least two interfaces to be measured.

This object plane may be positioned, for example, by utilizing items of information on reflectivity or coupled optical power, spatial frequencies in the image, or by utilizing prior knowledge or a model of the optical element.

Positioning the coherence areas at the level of the interfaces may, for example, be carried out by utilizing an item of information of visibility or contrast of the interference signal, or by using prior knowledge or a model of the optical element.

In order to be able to measure the differences in optical paths between the reference beams, and deduce therefrom distances between interfaces to be measured, the method according to the invention may also comprise a step of positioning two or more coherence areas around one and the same interface, so as to define an origin position of the delay lines used to move these coherence areas.

It should be noted that by virtue of the invention, several interfaces of an optical element may be measured sequentially or simultaneously, for example, starting with the upper interface and finishing with the lower interface, passing through all the "embedded" intermediate interfaces, without the need to turn over or handle the optical element.

In particular, it is possible to characterize an optical element, such as a lens, in one measurement or a measurement sequence, or at least by accessing it on only one face, without the need to turn it over.

Processing the interferometric signals acquired for the successive interfaces may be carried out sequentially, between measurements on the different interfaces, or once all the interference signals, for all the interfaces, have been acquired.

According to an embodiment that is in no way limitative, the step of processing the interference signals comprises a profilometry analysis of a plurality of interferograms acquired for one and the same interface to be measured.

The profilometry is based on processing sequences of interferograms acquired for a plurality of differences in optical paths in the interferometric sensor, which constitute the interference signal. These sequences can be acquired in different ways according to the analysis technique utilized.

The plurality of interferograms may in particular be acquired according to a phase-stepping interferometry method.

In this case, for each interface of the optical element, a plurality of interferograms is acquired for a plurality of difference values of optical paths or phases between the measurement and reference beams, in a range of optical path differences less than the coherence length of the light source. The phase and optionally the amplitude of the interferogram at any point of the field of view is then determined by applying a known algorithm, such as Carré's algorithm, to a succession of interference values obtained respectively at the points of this field of view for the different optical path difference values.

The plurality of interferograms may also be acquired according to a vertical scanning interferometry method.

In this case, for each interface, a plurality of interferograms is acquired for a plurality of difference values of optical paths or phases between the measurement and reference beams, in a range of optical path differences extending, preferably, beyond the coherence length of the light source. Then, at each point of the field of view, the optical path difference value is determined for which there is a zero path difference between the measurement beam reflected on the interface and the reference beam. To this end, it is possible to detect for example the maximum amplitude of the envelope of the interferogram, or the position where the phase of the interferogram is cancelled out, at the point in question.

According to another embodiment that is in no way limitative, the step of processing the interference signals may utilize a digital holography calculation method.

An interference signal or interferogram is saved. Then a digital holography method is used to reconstruct the interface in question digitally, by simulating the procedure of illuminating the interferogram on the detector with a digital reference wave. Such a method has the advantage of only requiring a single image or acquisition of an interference signal in order to calculate the shape of an optical surface.

Advantageously, the step of processing the interference signals may also comprise a correction step taking account of an item of information of the shape of the interfaces passed through by the measurement beam or beams, in order to obtain an item of information of the optical shape and/or geometric shape of the interfaces to be measured.

In fact, as explained above, during the measurement of surfaces or interfaces "embedded" in the optical element, the optical shapes measured may also depend on the media and the shapes of the interfaces passed through by the measurement beam before reaching these embedded surfaces, in particular due to the modifications of wavefronts and the aberrations introduced. In this case, a correction must be applied to determine the real optical or geometric shapes of the interfaces.

To perform this correction, it is possible to use a model of the light propagation and prior knowledge, or that acquired during previous measurements on the optical element, such as refractive indices of materials and positions and shapes of the interfaces passed through.

The method according to the invention may be implemented to measure the shapes and/or the positions of the interfaces of an optical element in the form of an optical assembly with lenses, such as a smartphone objective, the interfaces comprising the surfaces of the lenses.

BRIEF DESCRIPTION OF THE DRAWINGS

Other advantages and characteristics will become apparent on examining the detailed description of examples that are in no way limitative, and from the attached drawings, in which.

DETAILED DESCRIPTION

It is well understood that the embodiments that will be described hereinafter are in no way limitative. Variants of the invention may be envisaged in particular comprising only a selection of the characteristics described hereinafter, in isolation from the other characteristics described, if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

In particular, all the variants and all the embodiments described may be combined together if there is no objection to this combination from a technical point of view.

In the figures, elements common to several figures retain the same reference sign.

Figure 1:
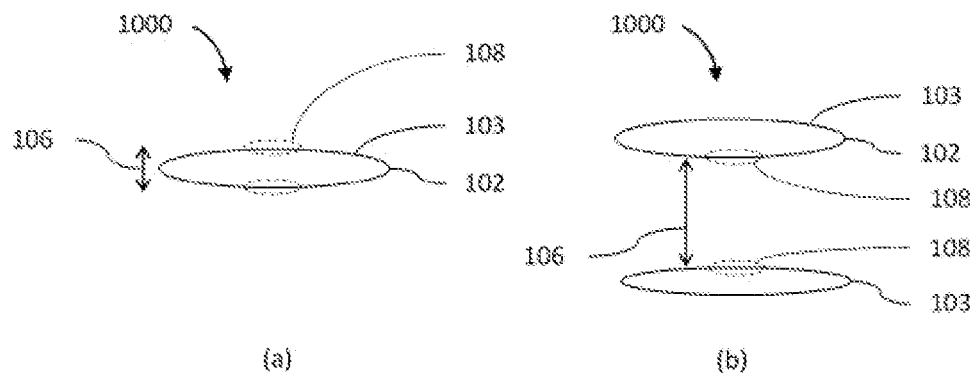
FIG. 1 is a diagrammatic representation of examples of optical elements to be measured, in particular utilizing the device of the invention.

FIG. 1 is a diagrammatic representation visualizing the principle of the measurements performed in the context of the present invention. In the examples shown, the element to be measured is an optical element 1000 constituted by one (FIG. 1(a)) or several (FIG. 1(b)) components 102 in the form of lenses. The optical element 1000 can be, for example, a camera objective, or lenses intended for the manufacture of a camera objective.

The device and the method according to the invention make it possible to obtain a measurement of the shape of the respective surfaces or the interfaces 103 of the optical element 1000, according to fields of view 108. They also make it possible to determine a distance 106 between successive interfaces 103 of the optical element 1000. This distance may correspond for example to a thickness of a component 102 of the optical element (FIG. 1a) or a distance between assembled components 102 of the optical element 1000 (FIG. 1b).

It should be noted that the fields of view 108 are positioned along a measurement axis which can correspond to an optical axis of the optical element 1000. The measurement axis can also correspond to any measurement direction of the optical element 1000, in the case for example where it is translated or pivoted with respect to the measurement axis in order to perform measurements of the shape of the interfaces 103 by a field recollement or sub-pupil technique.

Figure 2:
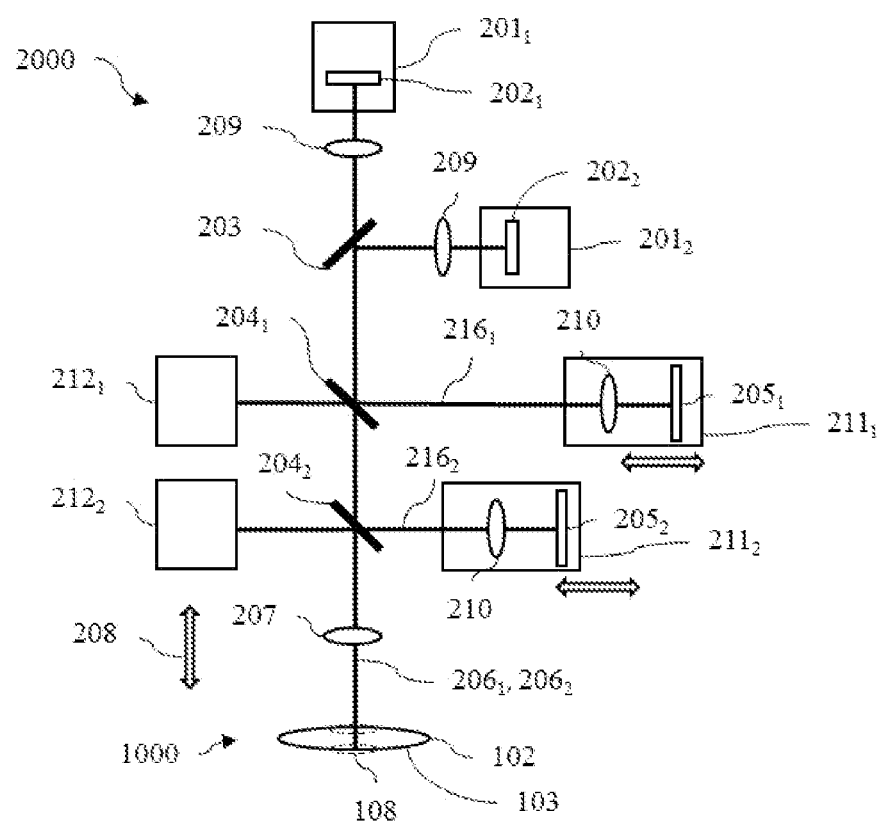
FIG. 2 is a diagrammatic representation of a first example of an interferometric device capable of being utilized in the context of the present invention.

FIG. 2 is a diagrammatic representation of a device capable of being utilized in the context of the present invention.

The device 2000, shown in FIG. 2, is based on a double Michelson or Linnik interferometer, each interferometer being formed by a beamsplitter element $204_1$, $204_2$, in the form of a cube or a beamsplitter block. Each interferometer comprises a measurement arm that directs a measurement beam $206_1$, $206_2$ to the optical element to be measured 1000, shown by a lens 102, and a reference arm with a reflector $205_1$, $205_2$, such as a mirror, in order to form a reference beam $216_1$, $216_2$.

Each interferometer is illuminated by a low-coherence light source $212_1$, $212_2$. The light source may comprise, for example, a superluminescent diode (SLD), a diode, a laser diode, a thermal light source (halogen lamp, etc.) or a supercontinuum source. It may also comprise a filtering device, for example with a diffraction grating and a slot, or interferential filters, in order to adjust the coherence length, for example to several tens or several hundreds of microns. The source can be arranged to emit in the visible or near infrared wavelengths, around one or more wavelengths.

The beamsplitter elements $204_1$, $204_2$ may of course be non-polarizing, or polarizing and associated with half-wave or quarter-wave beamsplitter blocks in order to constitute lossless couplers.

The measurement $206_1$, $206_2$ and reference $216_1$, $216_2$ beams reflected in the interferometer arms are directed via beamsplitter elements $204_1$, $204_2$ respectively to two cameras $201_1$, $201_2$. Each camera $201_1$, $201_2$ comprises an optical detector $202_1$, $202_2$ comprising a detector array, for example of the CMOS or CCD type.

The beams coming from the interferometers are separated by a detection beamsplitter element 203, so that the measurement beam $206_1$ and the reference beam $216_1$ of the first interferometer are incident on the first optical detector $202_1$ only, and the measurement beam $206_2$ and the reference beam $216_2$ of the second interferometer are incident on the second optical detector $202_2$ only. To this end, in the example shown, the light sources $212_1$, $212_2$ are centred around different wavelengths, and the detection beamsplitter element 203 is a dichroic element.

In each interferometer, when the difference in optical paths between the measurement beam and the reference beam is less than the coherence length of the source $212_1$, $212_2$, interferences are obtained on the corresponding detector $202_1$, $202_2$.

The device 2000 also comprises a lens or a focusing objective 207, and tube lenses 209, arranged so as to be able to define, with the focusing objective 207, an object plane at the level of the element to be measured 1000 conjugate to an image plane formed respectively on the optical detectors $202_1$, $202_2$. The reference arms may also comprise an objective 210 that also defines, with the tube lenses 209, a reference object plane conjugate to respective image planes of the optical detectors $202_1$, $202_2$.

The device 2000 is a full-field imaging device which makes it possible to image interfaces 103 of the optical element to be measured 1000, or interference signals generated by interfaces 103, according to a field of view 108 that is determined by the field of view of the imaging system and by its numerical aperture at the level of the focusing objective 207. In fact, to obtain a measurement, it is necessary for the reflection of the measurement beams $206_1$, $206_2$ on the interfaces 103 to be recoupled into the imaging system.

The device 2000 also comprises optical elements to focus the illumination beams coming from the light sources $212_1$, $212_2$ in the rear focal plane of the focusing objective 207.

The device 2000 also comprises a focusing movement means 208 the function of which is to move the object plane conjugate to the image planes formed by the sensors $202_1$, $202_2$ with respect to the measuring element 1000, so as, for example, to be able to position an object plane in proximity to or at the level of different interfaces 103 situated at different distances on the sensors $202_1$, $202_2$. This focusing movement means 208 may comprise a system for moving the focusing objective 207 or the lenses of this objective, for example with a linear or helical translation device. Alternatively or in addition, this movement means 208 may comprise a translation device or stage for moving the device 2000 with respect to the element to be measured 1000, or vice versa.

The device 2000 comprises optical delay lines $211_1$, $211_2$ for varying the respective optical lengths of the reference arms of the two optical interferometers. These delay lines can be produced by any means known to a person skilled in the art.

As shown in FIG. 2, the delay lines can be produced, for example, by means of a translation stage or another translation means moving the respective reference mirrors $205_1$, $205_2$ and the objectives 210 of the reference arms, so as, for example, to hold the reference mirrors $205_1$, $205_2$ in object planes conjugate to the image planes formed respectively by the sensors $202_1$, $202_2$.

The optical delay lines $211_1$, $211_2$ make it possible to modify the optical length of the reference arm of the corresponding interferometer, so as to move along the corresponding measurement beams the coherence area in which interferences between the measurement beam and the reference beam can form on the corresponding detector $202_1$, $202_2$. When this coherence area is positioned around an interface 103 of the element to be measured, it is possible to acquire interference signals in the measurable field of view 108 corresponding to this interface 103.

Advantageously, the optical delay lines $211_1$, $211_2$ may be adjusted separately, so as to position the coherence areas of the two interferometers on different interfaces 103 of the element to be measured 1000. It is thus possible to acquire simultaneously on the two detectors $202_1$, $202_2$, distinct interferometric signals each corresponding to one of the interfaces, and to process them separately in order to obtain for example items of information of the shape of each of the interfaces. It should be noted that in the context of the present invention, the interferometric signals coming from different interfaces can be processed independently, to deduce therefrom, from each one, a different item of information, pertaining to the corresponding interface.

Preferably, the coherence length of the light sources $212_1$, $212_2$ is chosen so as to be less than the distance between two interfaces of the object to be measured 1000, to avoid parasitic couplings.

Preferably, the optical delay lines $211_1$, $211_2$ comprise means making it possible to measure the optical delay introduced into each of them, and/or the difference in optical paths introduced between the measurement and reference beams of the two interferometers. This makes it possible in particular to measure the optical distance or thickness between the interfaces 103 of the measured element 1000, from optical delay measurements introduced by each delay line $211_1$, $211_2$ in order to obtain interferometric signals corresponding to each of the interfaces.

To this end, the delay lines may comprise optical rules or internal interferometers making it possible to measure the movement of a mobile element such as a mirror. Calibration of the assembly can be carried out by positioning the coherence area of the two interferometers on one and the same interface, so as to superpose them and to define an equilibrium position. The optical distance between two interfaces can then be measured from measurements of optical delay, or variation of optical delay, introduced into each delay line from the equilibrium position.

It should be noted that it is thus possible to obtain very accurate distance measurements, as they are obtained from optical delay measurements internal to the device. They are in particular free from the effects of vibrations or positioning errors of the interferometer with respect to the element to be measured, since they are obtained from simultaneous measurements of the interfaces in question.

Of course, to be able to acquire the interference signals of several interfaces 103 simultaneously, it is necessary for the depth of field of the focusing objective 207 to be sufficient to obtain signal from these interfaces 103. But these interfaces do not necessarily need to be positioned in an object plane conjugate to the sensors $202_1$, $202_2$. In fact, this can introduce a defocusing effect, which can even be desirable for certain processing techniques, such as digital holography, and which can in any case be compensated for by wave propagation algorithms.

In the example shown, the object plane conjugate to the image planes of the detectors $202_1$, $202_2$ may be, for example, positioned at the centre of a lens 102 of the element to be measured 1000 with the focusing movement means 208, so that the interfaces 103 to be measured are positioned on either side of this object plane.

According to other embodiment examples, the optical delay lines $211_1$, $211_2$ may comprise:
modules inserted in transmission respectively between the beamsplitter element $204_1$, $204_2$ and the reference mirrors $205_1$, $205_2$, with one or more mobile reflectors;
beamsplitter blocks with a refractive index greater than 1 and having variable thickness; and/or
optical fibre parts stretched by mechanical or piezoelectric means.

According to a variant, the device 2000 may comprise more than two interferometers.

According to another variant, the device 2000 may comprise a single camera 201 with a detector comprising colour filters on the pixels, suitable for separating the light coming from the two sources $212_1$, $212_2$ having different wavelengths.

According to yet another variant, the device 2000 may comprise a single camera 201 and two light sources $212_1$, $212_2$ of the same wavelength, illuminated sequentially, or a single source 212 and a switch element (optical switch) suitable for directing the light from this source alternately to the two interferometers, for example in one and the same measurement sequence.

Figure 3:
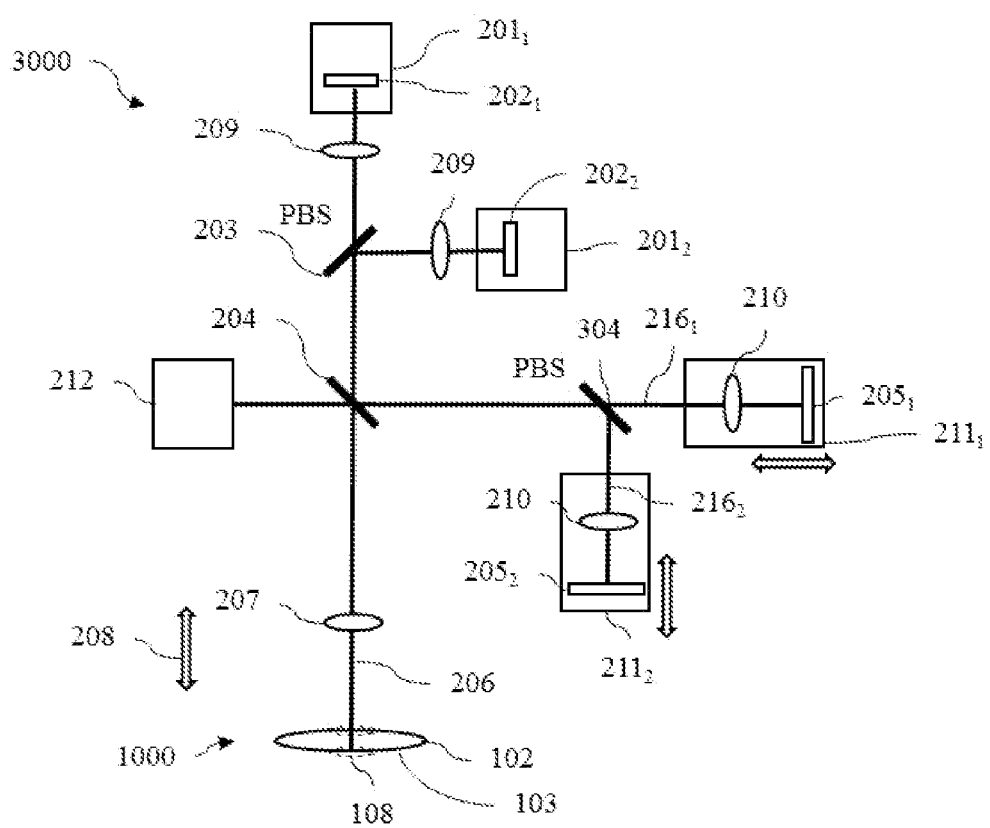
FIG. 3 is a diagrammatic representation of a second example of an interferometric device capable of being utilized in the context of the present invention.

FIG. 3 is a diagrammatic representation of another device capable of being utilized in the context of the present invention.

The device 3000, shown in FIG. 3, comprises most of the elements of the device 2000 in FIG. 2. Thus, only the differences are detailed.

The device 3000 is based on a low-coherence Michelson or Linnik interferometer, formed by a non-polarizing beamsplitter element 204, in the form of a cube or a beamsplitter block. The interferometer comprises a measurement arm that directs a measurement beam 206 to the optical element to be measured 1000, shown by a lens 102. It also comprises two reference arms formed by a polarizing beamsplitter of reference beams 304, such as a polarizing cube, and two mirrors $205_1$, $205_2$ in order to form two reference beams $216_1$, $216_2$, from a beam coming from the beamsplitter element 204.

The light source 212 is configured to emit a light that is non-polarized, or polarized along an axis inclined (for example at 45 degrees) with respect to the axes of the polarizing beamsplitter element of the reference beams 304. Then two reference beams $216_1$, $216_2$, with orthogonal linear polarizations, are obtained at the exit of the polarizing beamsplitter element of the reference beams 304.

The two reference beams $216_1$, $216_2$ and the measurement beam 206 coming from the reflections on the different interfaces 103 of the element to be measured 1000 are directed via the beamsplitter element 204 and another polarizing detection beamsplitter element 203 to two cameras $201_1$, $201_2$, each with an optical detector $202_1$, $202_2$ comprising a detector array, for example of the CMOS or CCD type.

The polarizing detection beamsplitter element 203 makes it possible to direct the first reference beam $216_1$, which is linearly polarized, to the first camera $201_1$ only, and the second reference beam $216_2$, which is also linearly polarized with a polarization orthogonal to that of the first reference beam, to the second camera $201_2$. This polarizing detection beamsplitter element 203 also makes it possible to separate the measurement beam 206 into two orthogonal polarization beams, each directed to a camera $201_1$, $201_2$.

The device 3000 also comprises, like the device 2000, optical delay lines $211_1$, $211_2$ making it possible to vary differently the respective optical lengths of the arms or of the reference beams $216_1$, $216_2$, and thus to position coherence areas simultaneously at different positions along the measurement beam 206, for example on different interfaces 103 of an element 1000 to be measured.

Thus, in the same way as for the device 2000, it is possible to acquire simultaneously on the two detectors $202_1$, $202_2$ distinct interferometric signals each corresponding to one of the interfaces of the element to be measured 1000, and to process them in order to obtain for example items of information of shape for each of the interfaces, and/or of distance between these interfaces.

Figure 4:
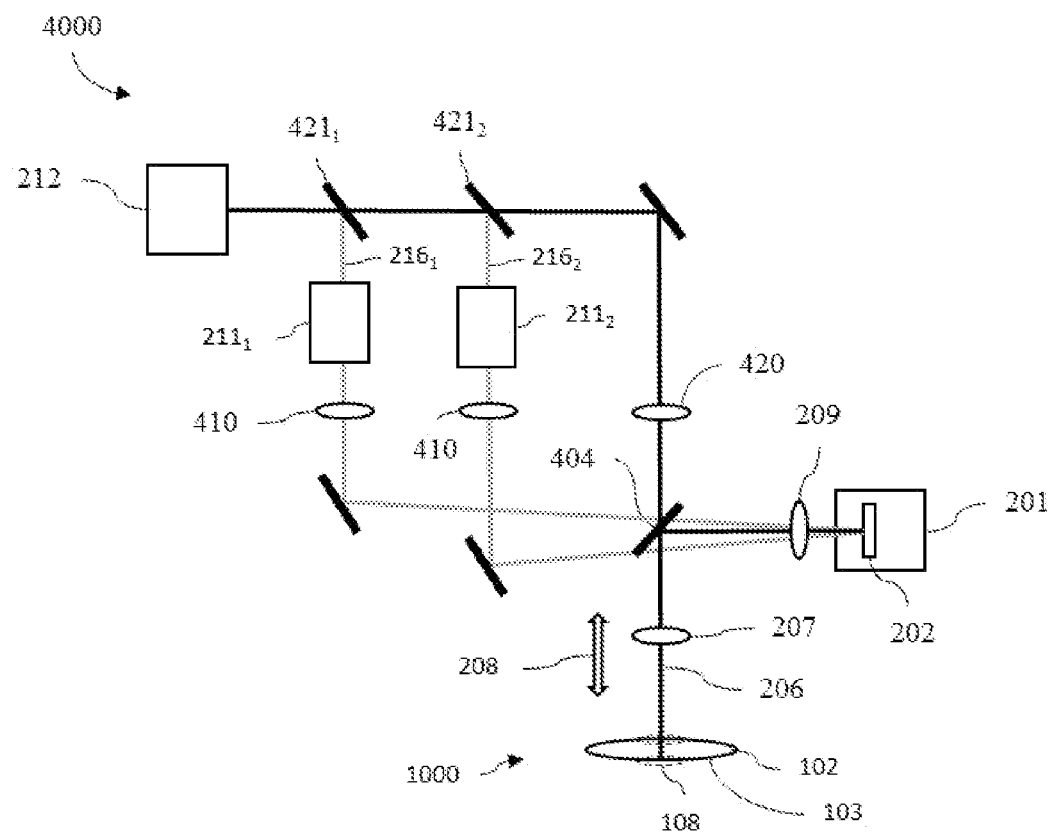
FIG. 4 is a diagrammatic representation of a third example of an interferometric device capable of being utilized in the context of the present invention.

FIG. 4 is a diagrammatic representation of another device capable of being utilized in the context of the present invention.

The device 4000, shown in FIG. 4, is based on a low-coherence Mach-Zehnder interferometer. It comprises a measurement arm that directs a measurement beam 206 to the optical element to be measured 1000, and two reference arms, forming two interferometers, in which respectively a first reference beam $216_1$ and a second reference beam $216_2$ propagate.

The interferometer is illuminated by a low-coherence light source 212. As above, this source may comprise, for example, a superluminescent diode (SLD), a diode, a laser diode, a thermal light source (halogen lamp, etc.) or a supercontinuum source. It may also comprise a filtering device, for example with a diffraction grating and a slot, or interferential filters, in order to adjust the coherence length to several tens or several hundreds of microns. The source may be arranged to emit in the visible or near infrared wavelengths, around one or more wavelengths.

The light from the source 212 is separated into a measurement beam 206 and two reference beams $216_1$, $216_2$, respectively by a first and a second beamsplitter element $421_1$, $421_2$, in the form of a cube or a beamsplitter block.

The interferometer comprises another combination beamsplitter element 404 in the measurement arm, also in the form of a cube or a beamsplitter block, to direct the measurement beam 206 to the element to be measured 1000, and transmit the light reflected by this element to the detector.

The measurement beam 206 as reflected by the element to be measured 1000 and the reference beams $216_1$, $216_2$ are directed to a camera 201 with a sensor 202 comprising a detector array, for example of the CMOS or CCD type.

The Mach-Zehnder interferometer can of course be produced with non-polarizing or polarizing elements and associated with quarter-wave or half-wave beamsplitter blocks in order to constitute lossless couplers. It can also be produced, at least partially, with optical fibres.

When the difference in optical paths between the measurement beam 206 and one of the reference beams $216_1$, $216_2$ is less than the coherence length of the source 212, interferences are obtained on the detector 202.

The device also comprises a focusing lens or objective 207, and a tube lens 209, arranged so as to define an object plane conjugate to an image plane formed on the sensor 202.

As above, the device 4000 is a full-field imaging device which makes it possible to image interfaces 103 of the optical element 1000, or interference signals corresponding to interfaces 103, according to a field of view 108 that is determined by the field of view of the imaging system and by its numerical aperture at the level of the focusing objective 207. In fact, to obtain a measurement, it is necessary for the reflection of the measurement beam 206 on the interfaces 103 to be recoupled into the imaging system.

The device 4000 comprises optical elements, such as the lens 420, to focus the illumination beam in the rear focal plane of the focusing objective 207. It also comprises optical elements, such as the lenses 410, to focus the reference beams $216_1$, $216_2$ in the rear focal plane of the tube lens 209.

The device 4000 also comprises a focusing movement means 208 the function of which is to move the object plane conjugate to the image plane formed by the sensor 202, so as, for example, to be able to position an object plane in proximity to or at the level of different interfaces 103 situated at different distances on the sensor 202. This focusing movement means 208 may comprise a system for moving the focusing objective 207 or the lenses of this objective, for example with a linear or spiral translation device. Alternatively or in addition, this focusing movement means 208 may comprise a translation device or stage for moving the device 4000 with respect to the optical element 1000, or vice versa.

The device 4000 also comprises optical delay lines $211_1$, $211_2$ for varying the respective optical lengths of the two reference arms of the two interferometers. These delay lines can be produced by any means known to a person skilled in the art. They can be produced, for example, by means of one or more translation stages or another translation means moving one or more mirrors or reflectors with respect to one another.

As above, the optical delay lines $211_1$, $211_2$ each make it possible to modify the optical length of the corresponding reference arm, so as to move, along the measurement beams, the coherence area in which interferences between the measurement and reference beams can form on the detector 202. When this coherence area is positioned around an interface 103 of the element to be measured, it is possible to acquire interference signals in the measurable field of view 108 corresponding to this interface.

According to the invention, the optical delay lines $211_1$, $211_2$ may be adjusted separately, so as to position the coherence areas of the two interferometers on different interfaces 103 of the element to be measured. It is thus possible to acquire simultaneously on the detector 202 distinct interferometric signals each corresponding to one of the interfaces, and to process them separately in order to obtain, for example, items of information of the shape of each of the interfaces. It should be noted that in the context of the invention, the interferometric signals coming from different interfaces may be processed independently, to deduce therefrom, from each one, a different item of information.

The coherence length of the source may be chosen so as to be less than the distance between two interfaces of the object to be measured, to avoid parasitic couplings.

Preferably, the optical delay lines $211_1$, $211_2$ comprise means making it possible to measure the optical delay introduced into each of them, and/or the difference in optical paths introduced between the measurement and reference beams of the two interferometers. This makes it possible in particular to measure the optical distance or thickness between the interfaces 103 of the measured element 1000, from optical delay measurements introduced by each delay line $211_1$, $211_2$ in order to obtain interferometric signals corresponding to each of the interfaces.

To this end, the delay lines may comprise optical rules or internal interferometers making it possible to measure the movement of a mobile element such as a mirror. Calibration of the assembly can be carried out by positioning the coherence area of the two interferometers on one and the same interface, so as to superpose them and to define an equilibrium position. The optical distance between two interfaces can then be measured from measurements of optical delay, or variation of optical delay, introduced into each delay line from the equilibrium position.

It should be noted, as above, that it is thus possible to obtain very accurate distance measurements, as they are obtained from optical delay measurements internal to the instrument. They are in particular free from the effects of vibrations or positioning errors of the interferometer with respect to the element to be measured, as they are obtained from simultaneous measurements of the interfaces in question.

Of course, to be able to acquire the interference signals of several interfaces 103 simultaneously, it is necessary for the depth of field of the focusing objective 207 to be sufficient to obtain signal from these interfaces 103. But these interfaces do not necessarily need to be positioned in an object plane conjugate to the detector 202. In fact, this can introduce a defocusing effect, which can even be desirable for certain processing techniques, such as digital holography, and which can in any case be compensated for by propagation algorithms.

In the example shown, the object plane conjugate to the image planes of the detector 202 may be, for example, positioned at the centre of a lens 102 of the element to be measured 1000 with the focusing movement means 208, so that the interfaces 103 to be measured are positioned on either side of this object plane.

In order to be able to detect and distinguish the interference signals coming from the two interferometers, the device 4000 is arranged in an off-axis interferometry configuration, according to which the measurement beam 206 and the reference beams $216_1$, $216_2$ are incident on the detector 202 with different angles of incidence. The reference beams $216_1$, $216_2$ are also incident on the detector 202 with a different angle of incidence. To the extent that they are focused in the rear focal plane of the tube lens 209, they are incident on the detector 202 in the form of a parallel beam the angular orientation of which can be accurately adjusted. Thus for each interferometer an interference signal is obtained with different spatial frequencies, which can then be separated in the Fourier plane, and demodulated to obtain a surface shape according to digital holography techniques as detailed below.

According to other embodiment examples, the optical delay lines $211_1$, $211_2$ may comprise:
   beamsplitter blocks with a refractive index greater than 1 and having variable thickness;
   optical fibre parts stretched by mechanical or piezoelectric means.

According to a variant, the device 4000 may comprise more than two reference arms.

According to another variant, the device 4000 may comprise a switch element (optical switch) making it possible to direct the light from the source 212 alternately to the two reference arms $216_1$, $216_2$, and/or a shutter making it possible to interrupt the reference beams alternately. It is thus possible to form alternately, for example in one and the same measurement sequence, the interference signals corresponding to the two reference arms, on the detector 202. In this case, the reference beams $216_1$, $216_2$ can be incident on the detector 202 with an angle of incidence that is identical or different.

Figure 5:
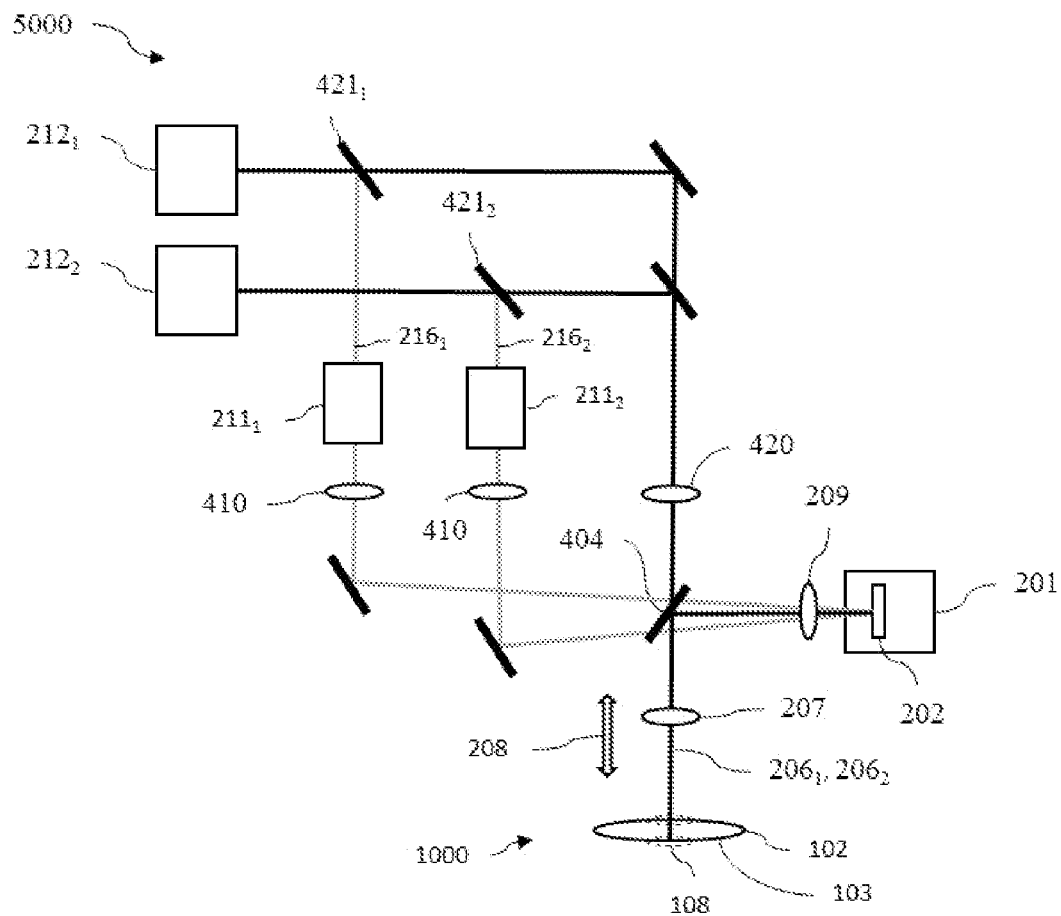
FIG. 5 is a diagrammatic representation of a fourth example of an interferometric device capable of being utilized in the context of the present invention.

FIG. 5 is a diagrammatic representation of another device capable of being utilized in the context of the present invention.

The device 5000, shown in FIG. 5, comprises most of the elements of the device 4000. Thus, only the differences are detailed.

The device 5000 differs from the device 4000 in that it comprises two low coherence length light sources $212_1$, $212_2$ operating at different wavelengths.

The light from each source $212_1$, $212_2$ is separated into a measurement beam $206_1$, $206_2$ and a reference beam $216_1$, $216_2$ respectively, by beamsplitter elements $421_1$, $421_2$. Thus the device 5000 comprises two distinct interferometers, each one being illuminated by a different source, but in which the measurement and reference beams are superposed on one and the same detector 202.

In order to be able to detect and distinguish the interference signals coming from the two interferometers, the device 5000 is arranged, like the device 4000, in an off-axis interferometry configuration, according to which the measurement beams $206_1$, $206_2$ and the reference beams $216_1$, $216_2$ are incident on the detector 202 with different angles of incidence. More specifically, in the example shown, the measurement beams $206_1$, $206_2$ are incident on the detector according to a normal incidence, and the reference beams $216_1$, $216_2$ are incident on the detector 202 with a different angle of incidence between them and different from that of the measurement beams $206_1$, $206_2$. Thus, as above, for each interferometer an interference signal is obtained with different spatial frequencies, which can then be separated in the Fourier plane, and demodulated to obtain a surface shape according to digital holography techniques as detailed below.

In this configuration, the optical sensor may be a monochrome sensor, or a colour-sensitive sensor, which makes it possible to improve the separation of the wavelengths of the two sources.

According to a variant of the device 5000 implementing a colour sensor, or with pixels provided with colour filters, the device 5000 may be configured in an off-axis interferometry configuration with the reference beams $216_1$, $216_2$ incident on the detector 202 according to one and the same angle of incidence.

According to another variant also implementing a colour sensor, or with pixels provided with colour filters, the device 5000 may be configured in an on-axis interferometry configuration with the measurement beams $206_1$, $206_2$ and the reference beams $216_1$, $216_2$ incident on the detector 202 in a normal configuration.

According to yet another variant of the device 5000, two monochrome sensors may be utilized as well as a dichroic element making it possible to direct the light from each source $212_1$, $212_2$ to a different sensor, in a similar way to the embodiment of the device 2000 shown in FIG. 2.

Figure 6:
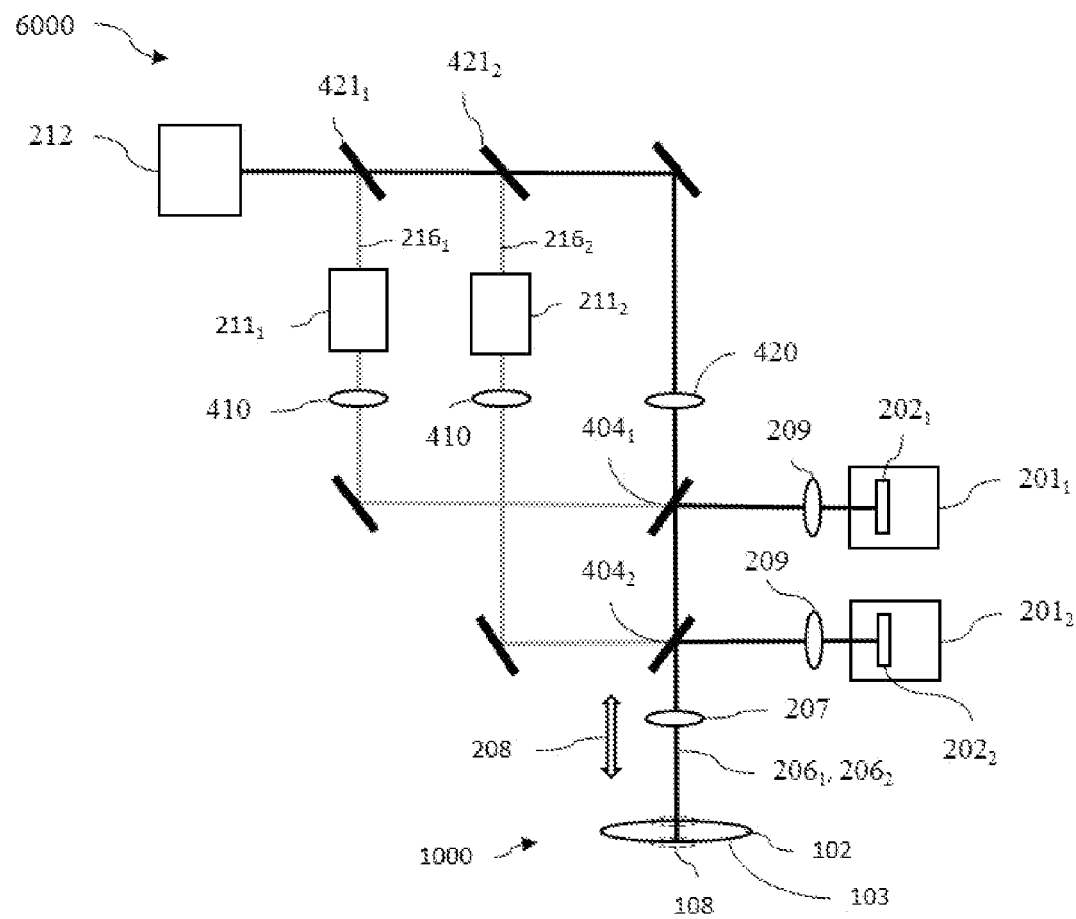
FIG. 6 is a diagrammatic representation of a fifth example of an interferometric device capable of being utilized in the context of the present invention.

FIG. 6 is a diagrammatic representation of another device capable of being utilized in the context of the present invention.

The device 6000, shown in FIG. 6, comprises most of the elements of the device 4000 in FIG. 4. Thus, only the differences are detailed.

The device 6000 differs from the device 4000 in that it comprises two cameras $201_1$, $201_2$ with two detectors $202_1$, $202_2$.

The device 6000 also comprises two combination beam-splitter elements $404_1$, $404_2$ in the measurement arm, each one being arranged to direct the measurement beam 206 coming from the element to be measured 1000, as well as only one of the reference beams $216_1$, $216_2$, to one of the detectors $202_1$, $202_2$.

Thus, each detector makes it possible to detect specifically the interference signal of one of the interferometers, in an on-axis or off-axis interferometry configuration.

With the full-field interferometric devices 2000-6000, when a surface or an interface 103 appears in the coherence area, an interference structure is obtained on the detector resulting from the interferences between measurement and reference beams for the field of view 108.

In order to deduce therefrom the shapes of surfaces, or at least of apparent optical surfaces, several known methods may be used, as described below.

Figure 7:
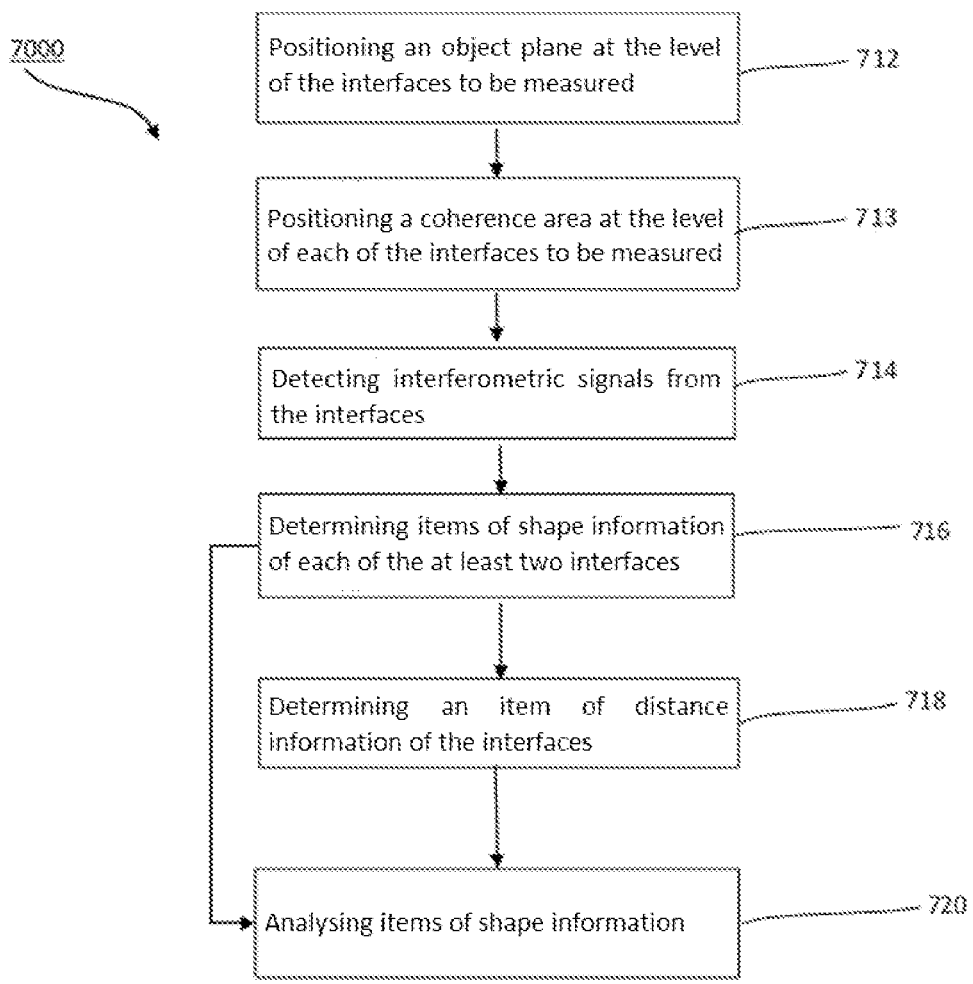
FIG. 7 is a diagrammatic representation of a non-limitative embodiment of a measurement method according to the present invention.

FIG. 7 is a diagrammatic representation of a non-limitative embodiment of a measurement method according to the invention, for performing measurements on at least two interfaces to be measured 103 of an optical element 1000.

The method 7000, shown in FIG. 7, may be repeated iteratively to measure a plurality of interfaces of an optical element 1000, for example:
by measuring two different interfaces at each iteration, or
by measuring a new interface and an interface measured beforehand during a fresh iteration.

The method 7000 may also be repeated iteratively to measure different portions of the same interfaces, according to different angles and/or measurement positions with respect to the optical element 1000. This may allow, for example, for measuring interfaces 103 of extended surfaces with respect to the field of view 108, and/or that have high curvature.

The method 7000 comprises a step 712 of positioning an object plane conjugate to an image plane or planes of the optical sensor or sensors. This object plane is positioned, for example, at the level of the interfaces to be measured 103, or in proximity to or between these interfaces.

Positioning the object plane may be performed, for example, by varying the distance between the focusing objective 207 and the optical element to be measured 1000, and/or by varying the focal length of the focusing objective 207 or other optical elements inserted in the measurement beam. Detecting the optimum focal length may be performed on the basis, for example, of a maximum coupled optical power criterion, an item of information of spatial frequencies of the image or prior knowledge of the optical element 1000.

The method 7000 also comprises a step 713 of positioning a coherence area respectively at the level of each of the interfaces to be measured 103.

To this end, the coherence areas in which interferences between measurement and reference beams can form are moved on the detector or detectors, by modifying the optical length of each reference arm. It is possible, for example, to move the reference mirrors $205_1$, $205_2$ of the devices 2000, 3000, or to vary the length of the delay lines $211_1$, $211_2$ of the devices 2000-6000 by any other means. When the coherence areas encompass respective interfaces to be measured 103, it is possible to acquire interference signals in the measurable field of view 108.

Of course, to obtain a usable signal from the interfaces 103 in question, it is necessary for the object plane conjugate to the image plane of the optical sensor or sensors to be appropriately placed with respect to these interfaces to be measured 103, and that the depth of field of the focusing objective 207 is sufficient. The positioning of the object plane performed in step 712 can thus be performed so as to optimize the interference signals coming from the interfaces 103 in question.

During a step 714 of the method 7000, interferometric signals corresponding to the interfaces to be measured 103 around which the coherence areas corresponding to the reference beams have been positioned are detected, by means for example of the optical sensor or sensors of the devices 2000-6000. At least two interference signals, resulting respectively from interferences between a measurement beam reflected by one of the interfaces to be measured and one of the reference beams, are selectively detected.

When the measurements are performed with full-field interferometers, as shown in FIGS. 2 to 6, full-field interference structures, resulting from the interferences between a measurement beam and a reference beam, are obtained directly for the entire field of view 108, on the optical sensor or sensors.

In order to obtain real geometric shapes of the surfaces or interfaces of the optical element, the optical shapes thereof must be determined beforehand, and corrected for the effects of propagation.

During a processing step 716 of the method 7000, the set of interference signals for each interface to be measured are processed digitally in order to deduce therefrom an item of information of the shape of these interfaces.

During the processing step 716, the optical and/or geometric shape of each interface is determined.

The optical shape is called "apparent" since it is affected by any interfaces that may be passed through. It is deduced from the interferometric measurements.

Different known methods may be used to determine optical and/or geometric shapes.

According to a first embodiment, profilometry methods may be used to carry out step 716. The profilometry is based on processing sequences of interferograms.

In this type of method, the measurement and reference beams are adjusted, preferably, so as to be incident on the detector with directions of propagation essentially parallel or merged, or slightly inclined, so as to produce interferograms with planar or slightly modulated intensities.

A first example of such a profilometry method implements algorithms based on phase-stepping interferometry (PSI).

To this end, for each interface i to be measured of the optical element, a plurality of interferograms (constituting the interference signal) is acquired for a plurality of difference values of optical paths or phases between the measurement and reference beams, in the coherence length of the source.

As explained above, these differences in optical paths or phase may be generated independently for two or more distinct interfaces, by using for example delay lines with several distinct reference arms.

Then, the phase and optionally the amplitude at any point of the field of view 108 of the interference signal thus constituted are determined by applying a known algorithm, such as Carré's algorithm, to the succession of interferograms obtained at the point in question for the different phase shifts, by unfolding the modulo 2 pi phase thus obtained.

Thus a set of difference values is obtained for phases measured $\varphi_{mi}(r_d)$ in the plane of the detector (or more precisely, phase differences between the measurement and reference beams on the detector) $r_d$ being a coordinate vector towards the points of the plane of the detector in an (X, Y, Z) reference system.

The optical shape $L_{mi}(r_d)$ of the surface i can then be determined with the conventional relationship:

$$L_{mi}(r_d)=\varphi_{mi}(r_d)\lambda/4\pi, \quad [\text{Math1}]$$

with $\lambda$ the central wavelength of the source in a vacuum.

The geometric shape $S_{mi}(r_d)$ can be deduced from the optical shape by the relationship:

$$S_{mi}(r_d)=L_{mi}(r_d)/n, \quad [\text{Math2}]$$

where n is the refractive index of the medium in which the measurement beam is reflected.

A second example of a profilometry method implements algorithms based on vertical scanning interferometry (VSI).

To this end, for each interface i in question, a plurality of interferograms (constituting the interference signal) is acquired for a plurality of optical delays between the measurement and reference arms of the interferometer, in a range of optical delays extending, preferably, beyond the coherence length of the light source.

As explained above, these differences in optical paths or phase can be generated independently for two or more distinct interfaces, by using delay lines with several distinct reference arms.

At each point $r_d$ of the detector, the optical delay is detected for which the optical path difference between the measurement beam reflected on the interface i and the reference beam is zero. To this end, it is possible to detect for example the maximum amplitude of the envelope of the interferogram, or the position where the phase of the interferogram is cancelled out. Thus the optical shape $L_{mi}(r_d)$ of the surface is obtained directly, from which it is possible to deduce, as above, the geometric shape.

According to another embodiment of step 716, a digital holography method may be used.

In a digital holography method, also called "off-axis interferometry", the measurement and reference beams are adjusted, preferably, so as to be incident on the detector with directions of propagation that are inclined, or forming an angle between one another.

When the measurement beam reflected by an interface i and the reference beam have a difference in optical paths or a delay less than the coherence length of the light source, an interference signal, or interferogram, $I_{mi}(r_d)$ is obtained on the detector, in which the phase information is encoded in diffraction grating fringes in the direction of inclination of the beams.

The interferogram on the detector can be represented by the following equation:

$$I_{mi}(r_d)=|E_{mi}(r_d)|^2+|E_R|^2+E^*_R E_{mi}(r_d)+E^*_{mi}(r_d)E_R, \quad [\text{Math3}]$$

with $E_{mi}$ the electromagnetic wave in complex notation as reflected by the interface i and incident on the detector (measurement beam), $E_R$ the reference electromagnetic wave in complex notation, assumed for simplicity to be constant, and * the complex conjugate.

The first two terms correspond to order zero, the third and fourth terms respectively to the real and virtual images.

By choosing an angle between the measurement and reference beams that is sufficiently wide, these different diffraction terms or orders are separated in the Fourier domain and can therefore be filtered.

The term corresponding to the real image can thus be obtained by filtering in the Fourier domain by:

$$E^*_R E_{mi}(r_d)=FFT^{-1}(FFT(I_{mi}(r_d))M), \quad [\text{Math4}]$$

where FFT is the fast Fourier transform and $FFT^{-1}$ its inverse. M is the filter applied in the frequency domain for filtering the term corresponding to the real image so as to preserve the spatial frequencies present in the numerical aperture of the focusing objective.

Once the term corresponding to the real image $E_R^* E_{mi}(r_d)$ has been obtained, it is possible to illuminate it digitally with a digital reference wave $E_R D$ corresponding to the reference wave used, to obtain the sought electromagnetic field expression $E_{mi}(r_d)$:

$$E_{mi}(r_d)=E_{RD}E^*_R E_{mi}(r_d). \quad [\text{Math5}]$$

It should be noted that by assuming the reference wave to be constant or uniform, this step may also be carried out in the Fourier domain by translating the filtered image to baseband (around the zero frequency).

It is then possible to determine, by using the phase $\varphi_{mi}(r_d)$ of the electromagnetic field $E_{mi}(r_d)$, the optical shape $L_{mi}(r_d)$ of the surface with the relationship [Math1] as well as the geometric shape $S_{mi}(r_d)$ with the relationship [Math2].

In the case of the devices 4000 and 5000 described with reference to FIGS. 4 and 5, respectively, in the configuration with two reference beams $E_R$, $E_{Rj}$ incident on the detector with different angles that are superposed with two measurement beams $E_{mi}$, $E_{mj}$ coming from reflections on the different interfaces i, j, provided that the coherence areas of the two interferometers are positioned respectively around the interfaces i, j and that, if the measurement beams originate from the same source, the interfaces i, j are separated by a distance greater than the coherence length of the source, the interferogram on the detector may be represented by the following equation:

$$I_m(r_d)=I_{mi}(r_d)+I_{mj}(r_d), \quad [\text{Math6}]$$

with $$I_{mi}(r_d)=|E_{mi}(r_d)|^2+|E_{Ri}|^2+E^*_{Ri}E_{mi}(r_d)+E^*_{mi}(r_d)E_{Ri} \quad [\text{Math7}]$$

and $$I_{mj}(r_d)=|E_{mj}(r_d)|^2+|E_{Rj}|^2+E^*_{Rj}E_{mj}(r_d)+E^*_{mj}(r_d)E_{Rj}. \quad [\text{Math8}]$$

By choosing an angle between the measurement and reference beams that is sufficiently high, and angles between the reference beams that are sufficiently different, these different diffraction terms or orders are separated in the Fourier domain, and can be filtered. The terms corresponding to the real images of the interfaces i, j may thus be obtained by filtering in the Fourier domain by:

$$E*_{Rj}E_{mi}(r_d)=FFT^{-1}(FFT(I_{mi}(r_d))M_i)  \quad\quad\quad \text{[Math9]}$$

and $$E*_{Rj}E_{mj}(r_d)=FFT^{-1}(FFT(I_{mj}(r_d))M_j). \quad\quad\quad \text{[Math10]}$$

$M_i$ and $M_j$ are the filters applied in the frequency domain for filtering the term corresponding to the real image for the interface i, j in question. As above, once the term corresponding respectively to the real image $E_{Ri}*E_{mi}(r_d)$, $E_{Rj}*E_{mj}(r_d)$, have been obtained, it is possible to illuminate it digitally respectively with a digital reference wave $E_{RDi}$, $E_{RDj}$ corresponding to the reference wave used for the interface i, j in question, to obtain respectively the sought electromagnetic field expression $E_{mi}(r_d)$, $E_{mj}(r_d)$, by applying the equation [Math5].

It should be noted that by assuming the reference wave to be constant or uniform, this step may also be carried out in the Fourier domain by translating the filtered image to baseband (around zero frequency).

It is then possible to determine, by using respectively the phase $\varphi_{mi}(r_d)$, $\varphi_{mj}(r_d)$ respectively of the electromagnetic field $E_{mi}(r_d)$, $E_{mj}(r_d)$, respectively the optical shape $L_{mi}(r_d)$, $L_{mj}(r_d)$ of each interface i, j with the relationship [Math1] as well as their respective geometric shape $S_{mi}(r_d)$, $S_{mj}(r_d)$ with the relationship [Math2].

The optical or geometric shape obtained as described above is a shape such as projected on the detector. In order to obtain the real optical or geometric shape of the interface, it is still necessary to take account of the effect of the optical system between the interface and the detector.

In order to determine the real shape of a measured interface i, in particular when it is located in an object plane conjugate to the image plane of the detector and assuming a perfect optical system, it is possible to use simply the enlargement of the imaging system that makes a point $r_i$ in the conjugate object plane correspond to a point $r_d$ of the detector, $r_i$ being a coordinates vector towards the points of the conjugate object plane in the reference system (X, Y, Z). Thus the real geometric shape of the interface is obtained, with the correct magnification $S_{mi}(r_i)$.

According to an embodiment, it is possible to take account of the aberrations of the optical system. This may be done for example by calibration, by performing measurements on a mirror positioned in place of the optical element 1000. It is thus possible to determine an optical shape resulting from these aberrations, which can be subtracted from the optical shape measured. It is thus also possible to take account of the phase profile of the reference beam on the detector. This makes it possible to improve the accuracy of the shape measurement carried out by the method according to the invention.

It should also be noted that if the interfaces to be measured are not positioned in a conjugate object plane of the detector, an additional optical aberration is introduced due to the defocusing that must be taken into account in the calculations.

Depending on the methods of acquisition and processing, in particular by implementing a digital holography technique as described above, it is possible to obtain a complete expression (with the amplitude and the phase) of the electromagnetic field $E_{mi}(r_d)$ at the detector. It is then possible to propagate the electromagnetic field digitally, for example to another reconstruction plane, with known methods. In particular, methods use Fresnel approximation, such as for example the approach by Fourier transform (Appl. Opt. 38, 6994-7001 (1999)), angular spectra (Opt. Express 13, 9935-9940 (2005)) or convolutions (Meas. Sci. Technol. 13, R85-R101 (2002)).

For example, in the case where the detector is not exactly in an image plane conjugate to the object plane of an interface, it is possible to determine the electromagnetic field $E_{mi}(r_d)$ in the image plane by digitally propagating the electromagnetic field measured at the detector to this plane.

Similarly, it is possible to determine the shape of the interfaces more rigorously by propagating the electromagnetic field from the plane of the detector to the interface in question.

The interfaces of the optical element 1000 passed through by the measurement beam or beams before an interface i in question 103 also modify the propagation of the measurement beam. They must therefore be taken into account in order to obtain an item of real optical or geometric information of the interface i.

The processing step 716 can therefore comprise a correction step in order to take account of the media passed through by the measurement beam. This correction can be applied to the optical or geometric shapes obtained beforehand.

According to a first example, this correction step is carried out by using models of propagation of the electromagnetic waves through the different materials and interfaces up to the interface i in question, including all the optical components of the interferometer and the interfaces passed through of the optical element to be measured 1000.

By way of illustration, the simple model described below may be used. This model is valid in the Fresnel approximation, assuming propagation of the electromagnetic waves in homogeneous media and through smooth or specular interfaces, without amplitude modulation. It is therefore in particular applicable for measuring optical elements with refractive elements or lenses.

It is also assumed that each interface 103 measured is positioned in an object plane conjugate to the image plane of the detector through the optical system present between the two. This may be obtained either by measuring in the object plane conjugate to the image plane of the detector, or by repropagating the measurement in an image plane conjugate to the plane of the interface in order to correct the defocusing errors. Under these conditions, it is possible to obtain an image of the interface with a relationship between these object and image planes that may be modelled by a single magnification G, as explained above.

It should be noted that the relationship, and thus the magnification, between the image plane and the object plane corresponding to each interface depends on the interfaces of the optical element 1000 passed through by the measurement beam up to the interface in question. However, in practice, to the extent that the magnification is essentially determined by the optical system of the interferometer, such as for example the focusing objective 207 and the tube lens 209, due to their high optical power, a known and identical magnification G between the image plane and the object planes positioned at the level of the different interfaces can be assumed.

The electromagnetic field of the measurement beam incident on the detector as reflected by a reference element, such as a flat mirror, is denoted $E_0(r_d)$.

The electromagnetic field $E_{m1}(r_d)$ reflected on the first interface of the optical element to be measured and incident on the detector may be written:

$$E_{m1}(r_d)=E_0(r_d)\exp[-i\varphi_{m1}(r_d)] \quad\quad\quad \text{[Math11]}$$

where $\varphi_{m1}(r_d)$ is the phase due to the reflection on the first interface, as detected by one of the interferometric methods described above by positioning the coherence area and the object plane conjugate to the image plane of the detector on the first interface.

It is possible, as described above, to deduce therefrom the optical shape of the first interface:

$$L_{m1}(r_d) = \varphi_{m1}(r_d)\lambda/4\pi. \quad \text{[Math12]}$$

The electromagnetic field reflected on the second interface and incident on the detector may be written, by disregarding the propagation terms that are not involved in the calculations:

$$E_{m2}(r_d) = E_0(r_d)\exp[i\varphi_{m1}(r_d)]\exp[-i\varphi_{m2}(r_d)], \quad \text{[Math13]}$$

where $\varphi_{m2}(r_d)$ is the phase due to the reflection on the second interface, as detected by one of the interferometric methods described above by positioning the coherence area and the object plane conjugate to the image plane of the detector on the second interface.

The term $$\varphi'_{m2}(r_d) = \varphi_{m2}(r_d) - \varphi_{m1}(r_d) \quad \text{[Math14]}$$

is the apparent phase, as measured, which includes terms dependant on the interface measured and the interface previously passed through by the measurement beam in order to reach the interface measured. To the extent that $\varphi_{m1}(r_d)$, determined beforehand, is known, it is thus possible to determine $\varphi_{m2}(r_d)$.

The corrected, or real, optical shape of the second interface may be determined from $\varphi_{m2}(r_d)$, as follows:

$$L_{m2}(r_d) = \varphi_{m2}(r_d)\lambda/4\pi. \quad \text{[Math15]}$$

Once the optical shapes and positions have been obtained, it is possible to deduce the geometric shapes therefrom, by taking account of the refractive indices of the different materials, and the magnification between the image and object planes.

According to a second example, the correction step is carried out by calculating a point spread function (PSF) or an optical transfer function (in the Fourier domain) of the optical system passed through by the measurement beam up to the interface i in question, including all the optical components of the interferometer and the interfaces passed through of the optical element to be measured.

The correction step may be carried out by using items of information on the design of the optical element, when these are available. It is possible for example to use design information, such as the nominal shapes or curvatures of interfaces, in order to correct the effect of the interfaces passed through by the measurement beam by implementing for example one of the models described above. It is also for example possible to validate the shape of an interface in a field of view with a measurement, then to use the complete nominal shape thereof (in particular for aspherical or "freeform" shapes) to correct the measurements of the following interfaces. It is also possible, for example, to use a nominal interface shape, but positioned along the optical axis as a function of the measurements.

The correction step is carried out sequentially, in the order of the interfaces passed through of the optical element. Thus, for each interface in question, corrected optical and/or geometric shapes are available of the previous interfaces passed through by the measurement beam.

The correction step may be carried out in different sequences.

It is in particular possible to acquire or measure all the apparent (uncorrected) phases or optical shapes for all the interfaces, then to calculate the corrected optical shapes and geometric shapes in a subsequent sequence.

It is also possible to acquire and process sequentially the interferometric signals of the different interfaces. In this case, it is possible to use the real (corrected) optical or geometric shape of the previously determined interfaces in order to adjust the focusing of the device more rapidly, and in particular to position the object plane more efficiently on the following interface.

As explained above, the geometric shapes of the interfaces and the thicknesses of the components may be determined from the optical shapes and thicknesses in the knowledge of the materials of the element to be measured or at least their refractive indices.

According to an example, the real positions and geometric shapes of the interfaces may be determined sequentially, for each interface measurement. This may allow, for example, for using these items of information to calculate the propagation of the light that passes through them in order to measure the following interfaces.

It is also possible to fully characterize the optical element to be measured in terms of optical magnitudes, without prior knowledge concerning the materials. It is thus possible to determine all the optical shapes and optical positions of interfaces corrected for the effects of propagation, then calculate the geometric shapes and dimensions of the optical element in a subsequent step.

According to the embodiment shown in FIG. 6, the method 7000 also comprises a step 718 of obtaining an item of distance information between the measured interfaces 103.

As stated above, according to an advantageous aspect of the invention, this step 718 may be carried out by measuring the difference in optical paths between the reference beams used for measuring the interfaces in question. In order to measure the difference in optical paths, an item of positioning information of at least one of the delay lines of the measurement device can be utilized, as explained in relation to the description of devices 2000 to 6000.

The item of distance information can correspond for example to a thickness of a component such as a lens, or to a distance between two components. This item of distance information can be optical, or, taking account of the refractive index of the media passed through, geometric.

It should be noted that this item of distance information may be obtained by any other means, such as an additional interferometer measuring directly the position of the interfaces 103 along a measurement axis.

According to the embodiment shown in FIG. 6, the method 7000 also comprises a step 720 of analysing the interfaces, by utilizing the items of information of shape obtained in processing step 716 of the method 7000 and optionally the items of distance information of step 718. It is for example possible to obtain:

decentring and/or tilt measurements of each interface with respect to a global frame of reference, such as an optical axis of the optical element;

measurements of relative position, distance, decentring and/or tilt of each interface measured with respect to the others.

Of course, the invention is not limited to the examples that have just been described, and numerous modifications may be made to these examples without exceeding the scope of the invention.

The invention claimed is:

1. A measurement device, for measuring the shape of interfaces to be measured of an optical element comprising a plurality of interfaces, the device comprising:
   at least one low-coherence light source;
   at least one optical sensor; and
   an interferometric device illuminated by said light source or sources and configured for:
      shaping at least one measurement beam and at least two reference beams;
      directing said at least one measurement beam to the optical element so as to pass through the interfaces to be measured;
      directing the light coming from at least two interfaces to be measured to the optical sensor or sensors;
   said at least one measurement beam and at least two reference beams being incidents on the at least one optical sensor with incidence angles different from each other,
   said optical sensor or sensors being globally configured to detect selectively at least two interference signals resulting respectively from interferences between the at least one measurement beam reflected by one of said at least two interfaces to be measured and one of the at least two reference beams;
   the measurement device also comprising:
   positioning means configured to position a coherence area at the level of each of the at least two interfaces to be measured; and
   digital processing means configured to produce, from the interference signals, an item of information of the shape of each of said interfaces to be measured according to a field of view.

2. The device according to claim 1, characterized in that the item of shape information comprises the optical shape and/or the geometric shape of the interfaces to be measured.

3. The device according to claim 1, characterized in that the device also comprises means for determining a difference in optical paths between the reference beams.

4. The device according to claim 1, characterized in that the device comprises at least two delay lines each inserted in one of the reference beams.

5. The device according to claim 1, characterized in that the positioning means are also configured to position with respect to one another an object plane conjugate to an image plane of the sensor, at the level of or in proximity to an interface to be measured, or between the at least two interfaces to be measured.

6. The device according to claim 1, characterized in that the interferometric device is of the Michelson interferometer or Linnik type.

7. The device according to claim 1, characterized in that the interferometric device is of the Mach-Zehnder interferometer type.

8. The device according to claim 1, characterized in that the device comprises two light sources emitting light with different wavelengths to one another.

9. The device according to claim 1, characterized in that the device comprises a plurality of optical sensors, each one being illuminated by a distinct reference beam.

10. The device according to claim 1, characterized in that the device comprises an optical sensor illuminated by a plurality of reference beams.

11. A measurement method, for measuring the shape of interfaces to be measured of an optical element comprising a plurality of interfaces, the method being implemented by a measurement device comprising at least one low-coherence light source, at least one optical sensor, an interferometric device illuminated by said light source or sources and configured for (i) forming at least one measurement beam and at least two reference beams, (ii) directing said at least one measurement beam to the optical element so as to pass through the interfaces to be measured, and (iii) directing the light coming from at least two interfaces to be measured to the optical sensor or sensors, said at least one measurement beam and at least two reference beams being incidents on the at least one optical sensor with incidence angles different from each other, the device also comprising positioning means and digital processing means,
   said method comprises the following steps:
      positioning, by positioning means, a coherence area at the level of each of the at least two interfaces to be measured;
      detecting selectively, by said optical sensor or sensors at least two interference signals resulting respectively from interferences between the at least one measurement beam reflected by one of said at least two interfaces to be measured and one of the at least two reference beams; and
      processing the interference signals by the digital processing means, so as to produce an item of information of the shape of each of said interfaces to be measured according to a field of view.

12. The method according to claim 11, characterized in that the method also comprises a step of analysing the interfaces by utilizing the items of information of shape, so as to produce at least one of the following items of information:
   a geometric shape of an interface;
   a comparison between a shape of an interface and a geometric model;
   a decentring and/or a tilt of the interfaces; and
   a relative position, a decentring and/or a tilt of one interface with respect to another.

13. The method according to claim 11, characterized in that the method also comprises a step of determining a difference in optical paths between the reference beams.

14. The method according to claim 13, characterized in that the method also comprises a step of determining an optical and/or geometric distance between the interfaces to be measured, by using the difference in optical paths between the reference beams.

15. The method according to claim 11, characterized in that the method also comprises a step of relative positioning of an object plane conjugate to an image plane of the sensor at the level of, or in proximity to, an interface to be measured or between the at least two interfaces to be measured.

16. The method according to claim 11, characterized in that the step of processing the interference signals comprises a profilometry analysis of a plurality of interferograms acquired for one and the same interface to be measured.

17. The method according to claim 16, characterized in that the plurality of interferograms is acquired according to a phase-stepping interferometry method, or according to a vertical scanning interferometry method.

18. The method according to claim 11, characterized in that the step of processing the interference signals utilizes a calculation method by digital holography.

19. The method according to claim 11, characterized in that the step of processing the interference signals also comprises a correction step taking account of an item of information of the shape of the interfaces passed through by the measurement beam or beams, in order to obtain an item of optical shape and/or geometric information of the interfaces to be measured.

20. The method according to claim 11, characterized in that said method is implemented to measure the shapes and/or the positions of the interfaces of an optical element in the form of an optical assembly with lenses, the interfaces comprising the surfaces of the lenses.

* * * * *